April 25, 1961 J. P. BALDWIN 2,981,443
CONTAINER AND SPOUT THEREFOR
Filed Sept. 4, 1956 4 Sheets-Sheet 1
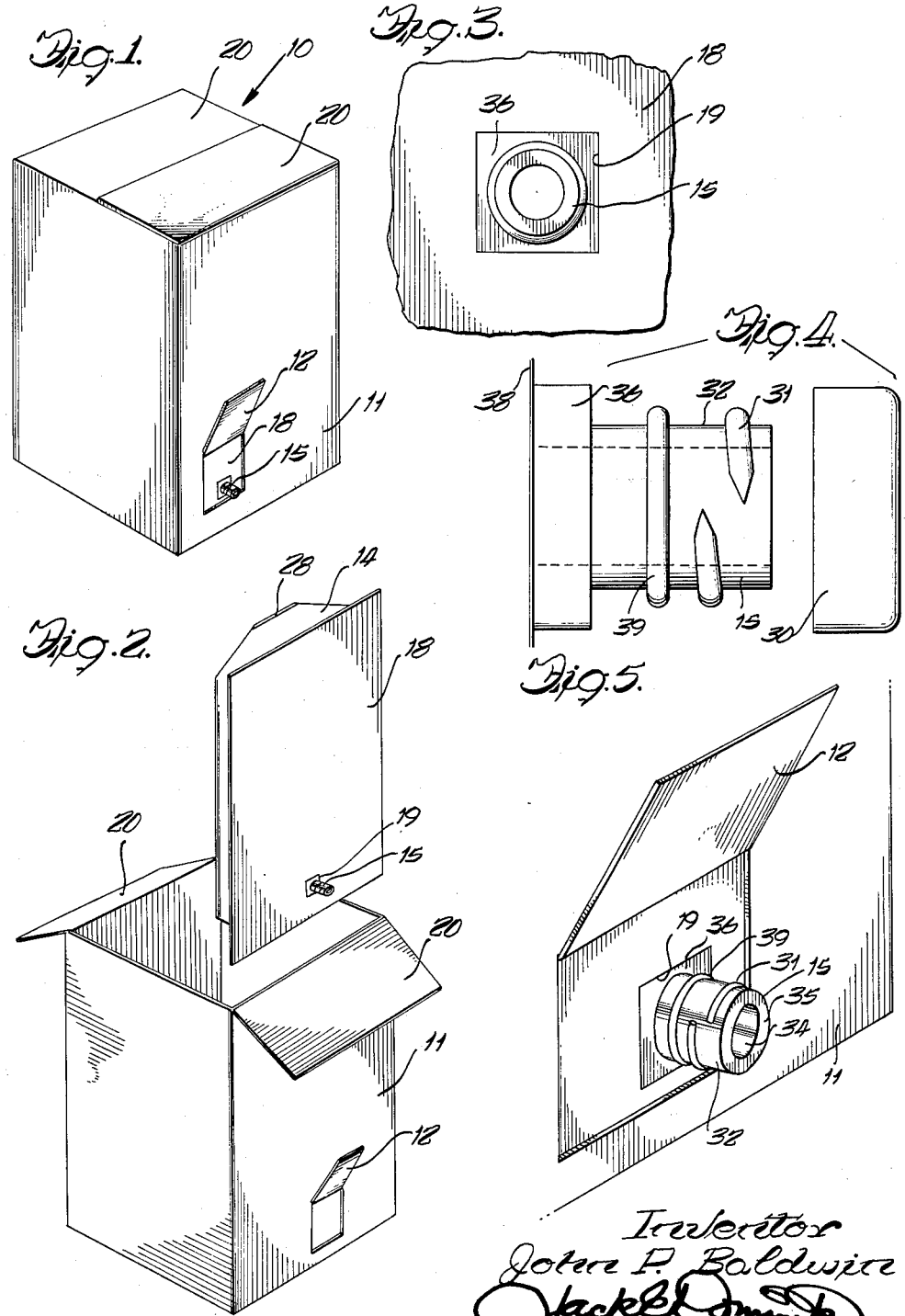

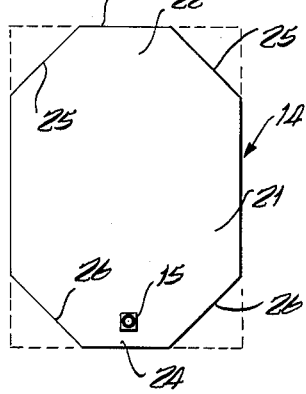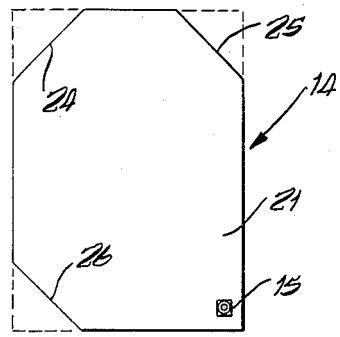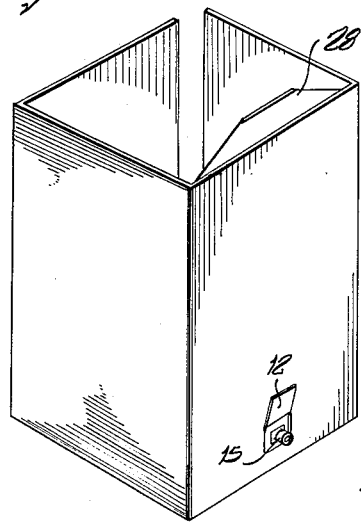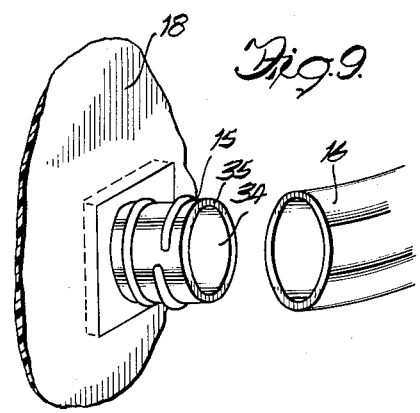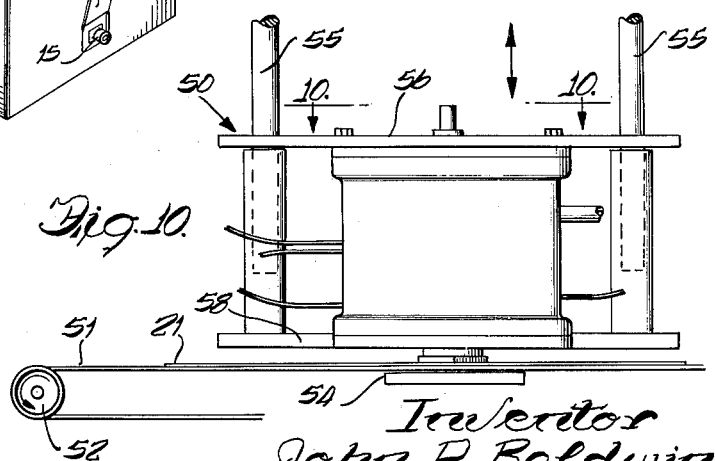

April 25, 1961 J. P. BALDWIN 2,981,443
CONTAINER AND SPOUT THEREFOR
Filed Sept. 4, 1956 4 Sheets-Sheet 3

Inventor
John P. Baldwin
Jack E. Dominik
Attorney

April 25, 1961 J. P. BALDWIN 2,981,443
CONTAINER AND SPOUT THEREFOR
Filed Sept. 4, 1956 4 Sheets-Sheet 4
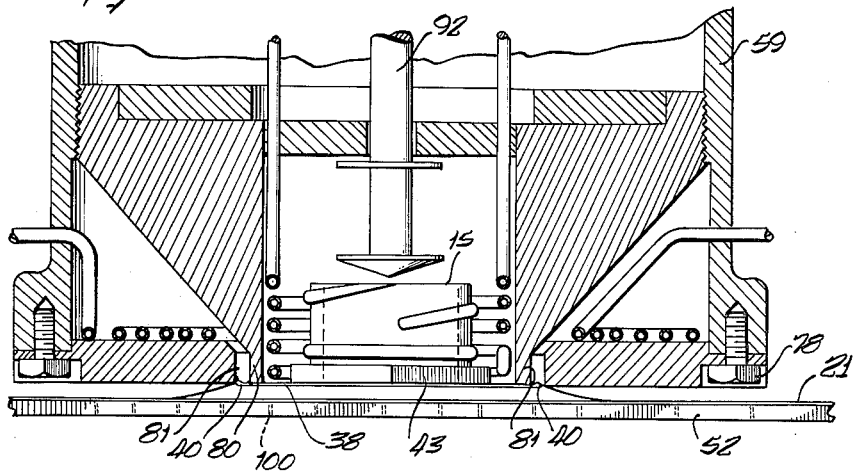
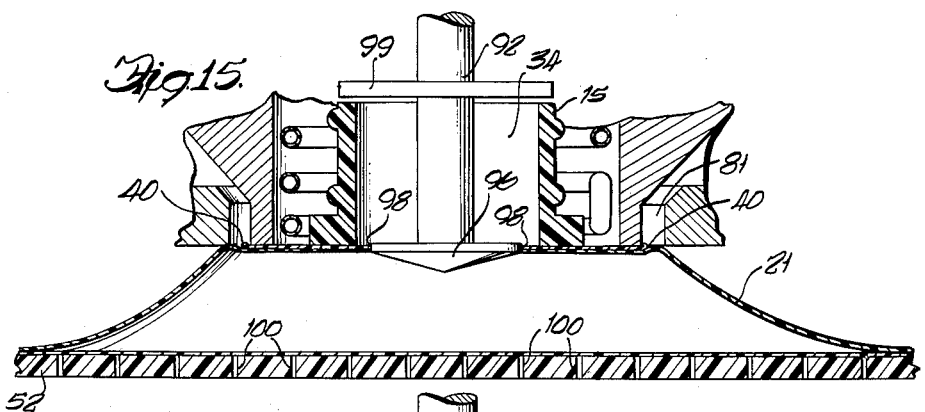
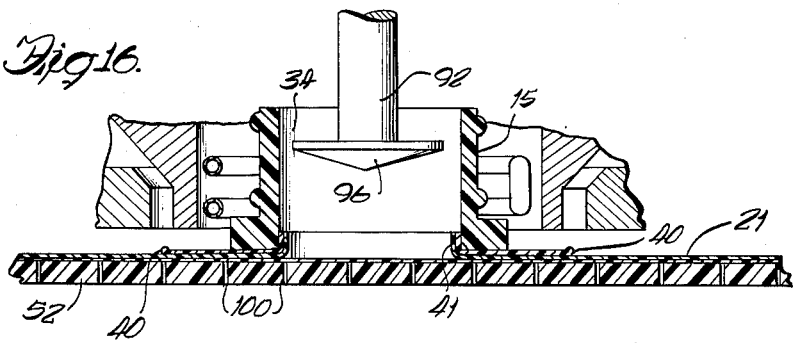
Inventor
John P. Baldwin
Jack Dominik
Attorney

United States Patent Office 2,981,443
Patented Apr. 25, 1961

2,981,443

CONTAINER AND SPOUT THEREFOR

John P. Baldwin, Decatur, Ill., assignor to B-Line Dispensers, Inc., Decatur, Ill.

Filed Sept. 4, 1956, Ser. No. 607,693

4 Claims. (Cl. 222—183)

The present invention relates to a method and mechanism for dispensing fluids from plastic film containers. More particularly the invention relates to a unique fluid container and integral dispenser, a method for making the container, and a mechanism for expediting the method of making the container.

The container as contemplated by the present invention finds its principal, although not necessarily exclusive, utility in dispensing foodstuffs such as milk, ice cream mixes, soda fountain syrups, and the like from sanitarily sealed plastic film containers. The plastic film dispensers or bag may be housed in a rigid disposable enclosure such as a corrugated box to facilitate shipping and handling. In addition, however, the plastic bag may also be employed in conjunction with returnable rigid containers formed from metal or plastic which are proportioned to nest within each other, thereby greatly reducing the cost of processing returns.

Heretofore liquid foodstuffs such as outlined above have been transported, stored, and sold in metal or glass containers. The excessive weight of such containers plus the necessity of sterilizing them before reuse has contributed to the high cost per gallon of handling bulk foodstuffs. Paper dispensers, necessarily treated to be leak-proof, are limited in size to a commercially acceptable half-gallon unit. Larger paper dispensers without adequate dispensing or pouring facilities would be difficult to handle. The packaging and dispensing of foodstuffs must meet rigid health and pure food regulations. The use of auxiliary pouring devices that are not an integral part of the container often run afoul of such restrictions.

In view of the foregoing, it is the general object of the invention to furnish an economical, sanitary, disposable container for fluids. A more specific object of the invention is to provide a plastic film bag and integral pouring or filling spout which has a wide variety of uses as a fluid container.

Another object of the invention is to provide a method for expeditiously, inexpensively, and sanitarily fixing the pouring spout to the plastic film container. A related object of the invention is to provide a mechanism which will fix the pouring spout to the plastic bags in a rapid manner with a minimum of waste and rejects.

Still another object of the invention is to provide a plastic film bag and associated pouring spout which use a minimum of plastic material for the gallonage contained.

A further object of the invention is to provide a plastic container for fluids which can be inserted into a rigid outer container and filled with a minimum of handling and in a manner which meets strict sanitation requirements.

Yet another object of the invention is to furnish a completely sealed plastic film container with a filling-pouring spout thereby eliminating the necessity for sealing by the filler while insuring a sanitary closure is delivered to the filler's premises.

Figure 1 is a perspective view of a container illustrative of the present invention.

Figure 2 is a partially exploded view of another container illustrating the invention showing the two principal internal elements.

Fig. 3 is an enlarged broken front elevation of the pouring spout used on the containers shown in Figs. 1 and 2.

Fig. 4 is a side elevation in enlarged scale of the pouring spout shown in Fig. 3.

Fig. 5 is enlarged perspective broken view of the pouring spout in the container illustrating the orientation of the covering flap.

Fig. 6 is a front elevation of the plastic film bag employed in the fluid container.

Fig. 7 is a front elevation of the plastic film bag showing the pouring spout in a different location than that in Fig. 6.

Fig. 8 shows a plastic film container within a partially enclosed rigid housing.

Fig. 9 is an enlarged perspective broken exploded view illustrating the intended relationship between the pouring spout and a pouring conduit.

Fig. 10 is a front elevation of a mechanism intended to affix the pouring spout to the plastic film bag or dispenser.

Fig. 14 is a perspective diagrammatic view showing the first step in the sealing operation of the sealing mechanism shown in Fig. 11.

Figs. 15 and 16 are sectional views in an enlarged scale of a portion of the sealing mechanism shown in Fig. 14 illustrating the pouring spout hole forming and sealing operation.

Figure 11:
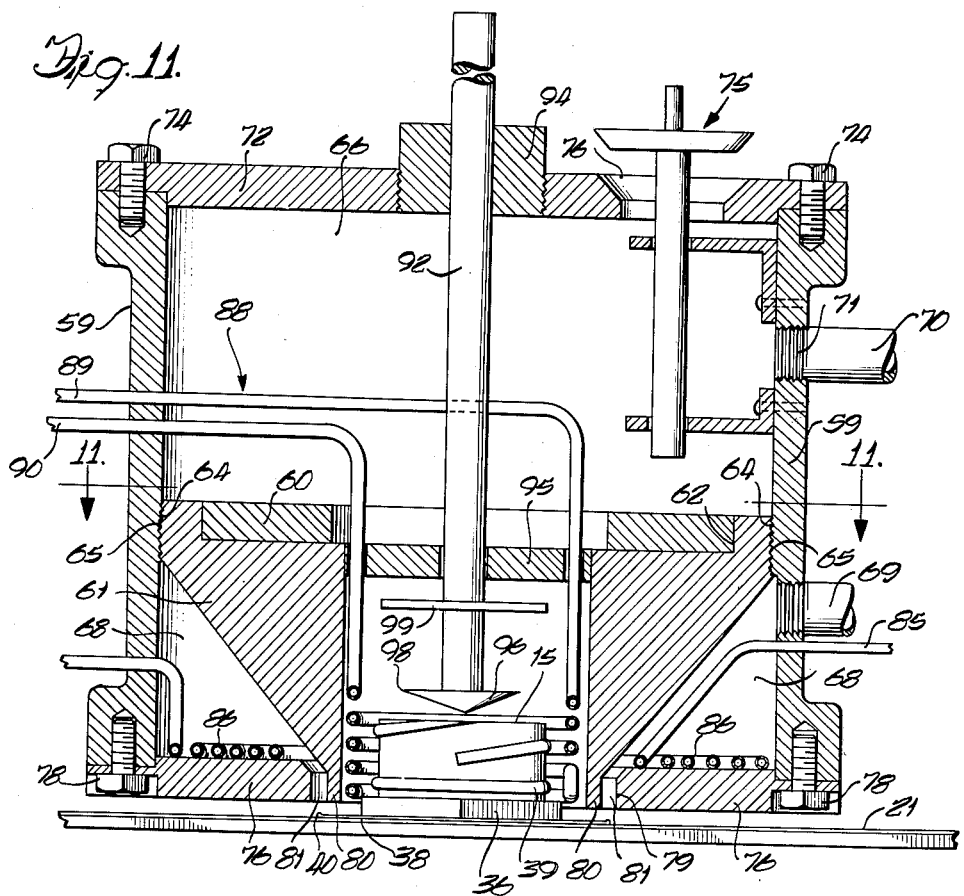
Fig. 11 is an enlarged partial sectional view taken along section line 10—10 of the mechanism shown in Fig. 10.
Figure 12:
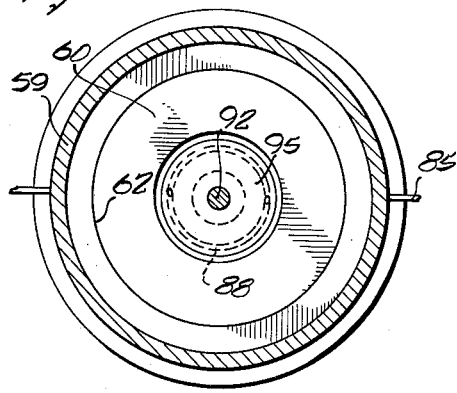
Fig. 12 is a horizontal sectional view of the sealing mechanism shown in Fig. 11 taken along section line 11—11 of Fig. 11.
Figure 13:
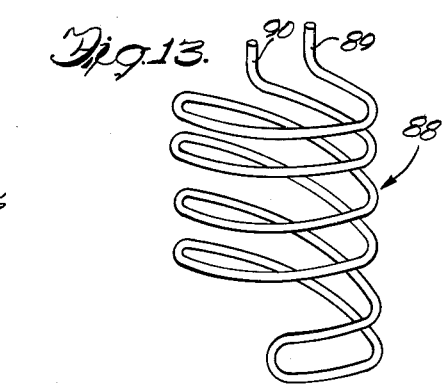
Fig. 13 is a perspective view illustrating the configuration of the pouring spout cooling coil shown in Fig. 11.

The invention resides in not only the end product, but also a method and a mechanism for making the end product. In broad outline the end product contemplates a unique spout fixed to a plastic film bag. Excellent results have been achieved through the use of polyethylene for both the bag and the spout. In the method the spout is fixed to the bag in a manner which facilitates high speed production, insures a uniform and binding seal, and prevents the entry of foreign material into the portion of the bag intended for the liquid foodstuffs. The sealing mechanism utilizes vacuum to both separate the two sides of the bags and sealingly open the conduit from the spout into the bag. In the illustrative embodiment hereinafter described in detail the spout is referred to as a pouring spout. It will be apparent, however, that the spout also may serve the function of a filling spout. In many applications the spout will serve the two fold function of a filling spout and a pouring spout.

The container

In the illustrative example of an embodiment of the invention, a plastic film bag is housed within a corrugated box to form a fluid container 10. The corrugated box 11 has a pouring flap 12 which exposes a portion of the plastic film bag 14 and its associated pouring spout 15. The container 10 is shipped with the pouring flap 12 in the closed position. This is accomplished by scoring the outline of the flap 12 on the corrugated box 11, the ultimate user tearing open the flap for access to the pouring spout 15.

In use the fluid may be poured directly from the pouring spout 15, or a pouring hose 16 (see Fig. 9) may be attached to the pouring spout 15 for purpose of draining the fluid. Also a spigot or faucet valve may be attached to the spout.

In order to fill the plastic film bag 14, the bag is inserted into the outer container 11 as illustrated in Fig. 2 by means of an assembly palate 18. The assembly palate 18 has a square opening 19 at its lower extremity proportioned to receive the pouring spout square base 36. This locks the spout to the palate thereby preventing a careless user from twisting the spout off the bag. Also the square may be employed as a datum to assist in locating the spout on the bag. The operator need only grasp the top of the film bag 14 and push the filling palate 18 down into the container 11 to aline the pouring spout 15 opposite the pouring flap 12. Thereafter the open end of the plastic film bag 14 is filled and sealed. To complete the closure the flaps 20 of the outer container 11 are folded into place and sealed preparing the unit for shipment. It will be observed that the pouring spout 15 may be located adjacent a corner of the outer container 11 or at a central portion of the outer container 11 as illustrated respectively in Figs. 1 and 2. Depending upon the mode of dispensing contemplated, the pouring spout 15 may be located at any pre-selected position on the plastic film container 14.

The plastic film container 14 comprises two principal elements, the bag 21 and the pouring spout 15. Referring now to Figs. 6 and 7, it will be seen that the plastic bag 21 is flat having substantially identical front and rear faces. The corners of the upper end 22 and the lower end 24, have been diagonally sealed presenting diagonal edges 25 at the upper end and 26 at the lower end. The two ends 22, 24 of the bag therefore assume the general configuration of an isosceles trapezoid. In the event that the pouring spout 15 is to be located near the corner of the outer container 10 as illustrated in Fig. 1, one of the corners, in this instance the right lower corner, is not sealed off and the pouring spout 15 located in that position as illustrated in Fig. 7.

A three-fold advantage is achieved by sealing off the corners of the bag 21. First, substantially less material is required to form the bag 21. In the case of polyethylene which serves as an excellent material for the bag, the salvage can be readily claimed and reused. Second, the top opening 28, being only approximately one-third of the width of the bag 21, is more conveniently sealed and may use a less expensive sealing apparatus. Third, the bottom of the bag 21, when filled with liquid, assumes the general configuration of a gold-fish bowl, thereby reducing the tendency for numerous folds of material to gather at the bottom of the container and trap the liquid contents making the exhausting of the contents of the bag 21 difficult, if not impossible without tearing open the top and inverting the container.

The pouring spout 15 is best illustrated in Fig. 4. The pouring spout may be molded from a material which is susceptible of convenient attachment to the bag 21. In the event that attachment by heat sealing is desired, as will be described hereinafter, the use of a polyethylene bag molded polyethylene pouring spout 15 proves advantageous. In the present instance an internally threaded cap 30 is attached to the pouring spout 15 by means of an external single wrapped thread 31 on the pouring spout conduit 32. The conduit 32 has a central through bore 34 leaving a cylindrical wall 35 at the outer portion of the conduit 32. A straight edge or square base 36 surrounds the base of the conduit 32 and terminates in a thin circular flange 38 at its base.

Although a wide variety of proportions may be used the following dimensions will serve to illustrate one illustrative embodiment of the pouring spout 15. The inner diameter or base 34 of the conduit 32 is one inch in diameter and the outer dimension one and one-quarter inch in diameter leaving a conduit wall thickness 35 of one-eighth inch. The single thread 31 is one-sixteenth inch high. The cap stop 39 is also one-sixteenth inch. The square base 36 is one and one-half inches on each edge, and the circular base flange 38 of two and five-eighths inches in diameter. The distance between the cap stop 39 and the square base 36 is 5/32" and the height of the square base 36 above the base flange 38 also 5/32". The base flange in the polyethylene molded pouring spout is molded to 5/1000 of an inch or 5 mils in thickness. An outer rim 40 (see Figs. 14 through 16), the height of which may vary between 1 and 200ths of an inch or 10 to 20 mils, is provided.

Referring now to Fig. 16, it will be seen that a narrow cylindrical flange 41 is sealed to the bottom face of the conduit bore 34. The flange 41, as will be described in detail later, is formed from one of the faces of the film bag 21.

In some instances it may prove desirable not to form a through conduit from the pouring spout into the bag 21. In this event a thin membrane portion of the bag 21 will cover the base opening of the conduit 34 of the pouring spout 15.

*Method of forming plastic film container*

From the description of the plastic film container above, it will be appreciated that the pouring spout 15 can be readily affixed to the plastic film bag 21 simply by gluing or applying a mutual solvent to the bag and conduit at their interface in the event their respective materials appeared of such treatment. If the material chosen for the bag and the pouring spout are susceptible of heat sealing, then a unique, rapid, inexpensive, and highly sanitary method may be employed to form a plastic bag 21 and apply the pouring spout 15.

The bag 21 is formed from a continuous tube of film which is folded flat presenting a front and rear face. The tube may be either extruded or have longitudinally sealed edges. The tube is transversally heat sealed at one end and sliced at the other leaving a closed bottom and an open top. The triangular corner seals at the bottom may be accomplished as the bottom edge is heat sealed or in separate steps. The same applies to the formation of the top seals 25.

After the bag has been conformed to its shape as illustrated in Fig. 6 or Fig. 7, the face opposite to that to which the pouring spout 15 is to be attached, is secured in place on the belt 52 by means of a vacuum which works through vents 100. Thereafter the pouring spout is placed in position over the spout to which it is to be sealed, and a vacuum applied in its inner conduit, and around the peripheral edge of the outer rim 40 of the base flange 38. This vacuum serves to suck the upper face of the upper bag away from the lower face which is also secured by vacuum. Although the distance does not appear to be critical in a control operation, it has been found desirable in a five-gallon bag to separate the two faces by approximately two inches. The vacuum is applied both through the inside and around the outside of the annular mounting flange 38. Flat surface contact is maintained between the plastic film and the mounting flange. At this point sufficient heat is applied to the outer face of the mounting flange to render a ringed portion of the flange plastic and to induce a similar inner ringed portion of the bag film to become plastic. The heat is permitted to dwell a sufficient period of time to accomplish an annular seal between the pouring spout flange and the bag.

In the event that it is desired to pierce the bag so that the central conduit of the pouring spout 15 connects directly to the inside of the bag, such action is accomplished at approximately the same time as the pouring spout is sealed to the bag.

Sufficient heat is applied to the plastic film which covers the pouring opening of the pouring spout to render it slightly plastic. The vacuum applied to the pouring spout will then tend to suck a bubble of plastic film into the pouring spout mouth.

By inserting a heated projection into the pouring spout mouth which approaches the inner diameter of the pouring spout mouth, the film bubble is broken, with the edges of the bubble curling to form an annular cylindrical flange up against the inner entrance of the pouring spout mouth. The heat which renders the membrane sufficiently soft to form a bubble is maintained long enough to insure the permanent deformation which forms the inner flange and assists it to seal against the pouring spout mouth.

Thereafter the vacuum is released from the pouring spout and the extended bag slowly collapses. At the same time the heat sealed elements of the bag freeze in position and the bag may be moved to another location by moving the vacuum source which secures the lower face of the bag, or releasing the lower face vacuum and manually moving the bag.

By employing the foregoing method of using a vacuum, sanitation is insured as foreign particles are constantly being urged out of the bag rather than into the bag. Also, the formation of a flanged connection to the bag presents a lesser possibility of trapping fluids than a pierced membrane might exhibit.

*Mechanism for heat sealing pouring spout to bag*

A particular pouring spout sealing device 50 has been developed and is illustrated in Figs. 10 through 16. Referring now to Fig. 9, it will be seen that the heat sealing mechanism 50 contemplates an endless belt 51 driven by a roller or drum 52 to advance the plastic film bag 21 beneath itself. A vacuum hold down station 54 is provided beneath the belt, and works through holes provided in the belt 51 to secure the lower face of the plastic bag to the belt as it passes under the sealing mechanism 50. A pair of support shafts 55 are attached to upper and lower mounting plates 56, 58 which permit the sealing mechanism to move in and out of position above the plastic bag 21.

Referring now to Fig. 11, it will be seen that the sealing mechanism 50 contemplates a case or housing 59 with an inner annular ring type electrical heating washer element 60. The heating element may be formed of chrome Nichrome steel or like resistance heating material. Below the heating element 60 a frusto-conical heat sealing element 61 is provided. The heat sealing element 61 should conduct heat very rapidly, aluminum having been found an excellent material for this purpose. A circular seat 62 is provided in the base of the heat sealing element 61 to receive the heating element 60. The periphery of the base of the heat sealing element is a threaded portion 64 which engages an internal threaded ring 65 of the housing or case 59.

The heat sealing element 61 serves to divide the inner portion of the housing 59 into an upper vacuum chamber 66 and a lower annular vacuum chamber 68.

A vacuum pipe 70 is connected to the upper vacuum housing 66 by means of a threaded connection 61 to the casing 59. A top plate 72 secured by bolts 74 to the cylindrical casing 59 completes the upper vacuum chamber enclosure. A poppet valve assembly 75 sits in the valve seat 76 in the top plate 72 providing a means for returning the conditions in the upper vacuum chamber 66 to approximately atmosphere. A lower vacuum chamber vacuum pipe 69 is threaded to the casing 59 to exhaust the lower vacuum chamber 68 independently of the upper vacuum chamber 66. External means in the vacuum pipe 69 are provided to return the lower vacuum chamber 68 to atmosphere.

A bottom plate 76, annular in form, is mounted to the cylindrical casing 59 by means of bottom plate bolts 78. An annular central bore 79 in the bottom plate 76 cooperates with the lower heat sealing ring portion 80 of the heat sealing element 61 to define an annular vacuum port 81. The annular vacuum port 81 is of such a dimension that its average diameter approximates the average diameter of the rim 40 of the mounting flange 38 of the pouring spout 15.

Because of the specific localization required of the heating elements, and the undesirability of raising the temperature of the bag film in surrounding areas a unique cooling mechanism has been provided. Two particular cooling coils are involved. The base plate cooling coil 85 is led in and out through holes in the casing 59 and is wound in spiral fashion on the upper face of the annular base plate 76. Water or any other cooled liquid is pumped through the pipe 85 and the coils 86 to keep the base plate sufficiently cool so that heat radiated from the sealing element 61 will not cause any of the film beneath the base plate 76 to reach the point of plasticity.

To prevent the sealing ring 61 from overheating the pouring spout 15 when it projects within the central bore of the sealing element 61, a unique pouring spout cooling element 88 has been developed. Since the physical confines are small, the pouring spout cooling coil 88 is double wound upon itself so that the entrance pipe 89 and exhaust pipe 90 are the only two elements projecting down the bore of the heat sealing element 61.

In order to open the conduit into the bag and eject the pouring spout 15, a central shaft 92 extends down the center of the sealing ring 61 and is bushed by means of bushing 94 to the upper plate 72 so that it can be independently actuated. A vacuum chamber divider 95 supports the shaft 92 within the sealing ring 61. A mushroom shaped head 96 is provided at the bottom end of the shaft. The conical head 96 has a cylindrical rim 98 of a diameter of the pouring spout 15. Depending upon the materials used for the bag and spout, it may prove desirable to independently heat the conical head 96. An ejection ring 99 is secured to the shaft 92 slightly above the conical head 96, and is of a diameter sufficient to abut the upper end of the pouring spout 15.

The operation of the various elements of the sealing mechanism will be best understood by reference to Figs. 14 through 16. The plastic film bag 21 passes over the endless belt 51 and the bottom face thereof is secured to the belt by means of a vacuum passing through the holding holes 100. The belt is then moved until the pouring spout 15 is beneath the work station. Then the sealing mechanism 50 is lowered and the poppet valve 75 closed and the vacuum connections 69, 70 actuated to exhaust the vacuum chambers 66, 68 in the sealing mechanism. This action sucks the upper face of the bag 21 against the pouring spout 15 and the pouring spout flange 38. The vacuum which is applied at the pouring spout flange rim 40 through the vacuum ring 81 serves to provide firm contact between the pouring spout flange 38 and the upper face of the bag 21. This action also serves to firmly establish contact between the heat sealing ring 80 and the flange 38.

After a predetermined interval, depending upon the thickness and type of material used, the membrane portion of the bag 21 which covers the opening to the pouring spout 15 is formed convexly upward as illustrated in dotted lines 43 in Fig. 14. In timed relation the shaft 92 is lowered with respect to the pouring spout 15 and the conical head 96 causes the membrane to flow around its rim 98 and flange upwardly forming an inner flange 41 as best illustrated in Fig. 15. As the shaft 92 continues downwardly, the knock-out ring 99 abuts the top of the pouring spout 15, and the poppet valve 75 is opened. With the release of the vacuum through the spout opening 34 and the outer vacuum ring 81, the weight of the pouring spout 15 plus the action of the knock-out ring 99 releases the pouring spout 15 and its associated face of the bag to drop back down onto the belt 52. Thereafter the shaft 92 is withdrawn and the pouring spout 15 slowly settles down onto the flat bag 21 and the seal is completed and freezes in place.

In review, the invention teaches a novel type of plastic film container which may be advantageously employed with liquid foodstuffs. The container may be easily discharged in a sanitary manner. In addition, a method has been disclosed for forming the container in a sanitary and efficient manner. One mechanism has been shown which will perform the sealing of the pouring spout to the plastic bag quickly, efficiently, and in a sanitary manner.

Although particular embodiments of the invention have been shown and described in full here, there is no intention to thereby limit the invention to the details of such embodiments. On the contrary, the intention is to cover all modifications, alternative embodiments, usages and equivalents of the mechanism for dispensing fluids from plastic film containers as fall within the spirit and scope of the invention, specification, and appended claims.

I claim as my invention:

1. In a container assembly, the combination of a rigid wall having a non-circular opening defined therein, a thermoplastic bag adjacent one surface of said wall, and a thermoplastic pouring spout heat-sealed to the outer surface of said bag, said spout comprising a neck portion insertable into the non-circular opening formed in the wall, a non-circular formation at the base of said neck portion, the non-circular formation being accommodated within the non-circular opening in the wall to limit rotational displacement of the pouring spout relative to the bag, and a thin peripheral flange extending outwardly from the base of said non-circular formation, the thin peripheral flange being heat-sealed to the outer surface of the thermoplastic bag.

2. A container assembly comprising a receptacle made of a relatively rigid material so as to impart to the receptacle a predetermined shape and to withstand internal pressure, a thermoplastic bag within the outer receptacle, a thermoplastic pouring spout heat-sealed to the outer surface of said bag, said spout having a neck portion, a non-circular formation at the base of said neck portion and a thin peripheral flange extending outwardly from the base of the non-circular formation, the thin peripheral flange being heat-sealed to the outer surface of said bag, and means defining a non-circular opening in a wall adjacent said bag for insertion of the pouring spout therein, the outer periphery of the non-circular formation of the pouring spout being substantially complementary in shape to the non-circular opening to prevent twisting of the spout relative to the bag.

3. A container as set forth in claim 2 wherein the neck of the spout is threaded to make it possible to couple it to another threaded element, during which coupling the non-circular opening prevents rotational displacement of the spout.

4. A container for fluids comprising a plastic film bag, a plastic pouring spout having a passage therethrough and a thin plastic flange formed integrally with the pouring spout and surrounding the inlet end thereof, said thin flange being heat-sealed to the outer surface of the plastic film bag, the seal completely surrounding the passage and the portion of the plastic film bag within the heat-seal forming a thin membrane across the inlet end of the passage through the pouring spout to prevent flow from the inside of the bag through the pouring spout until the thin membrane is punctured.

References Cited in the file of this patent

UNITED STATES PATENTS

| | | |
|---|---|---|
| 1,293,860 | Mock | Feb. 11, 1919 |
| 2,123,552 | Helwig | July 12, 1938 |
| 2,155,759 | Hocke | Apr. 25, 1939 |
| 2,203,072 | Albright | June 4, 1940 |
| 2,661,741 | Puckman | Dec. 8, 1953 |
| 2,670,502 | Cox | Mar. 2, 1954 |
| 2,685,385 | Kuss | Aug. 3, 1954 |
| 2,691,798 | Winchester et al. | Oct. 19, 1954 |
| 2,793,073 | Bateman | May 21, 1957 |
| 2,815,887 | Ford et al. | Dec. 10, 1957 |
| 2,861,718 | Winzen | Nov. 25, 1958 |